UNITED STATES PATENT OFFICE.

MAX HARTMANN, OF BASEL, SWITZERLAND, ASSIGNOR TO SOCIETY OF CHEMICAL INDUSTRY IN BASLE, OF BASEL, SWITZERLAND.

MERCURY COMPOUNDS OF GLUCOSIDS AND PROCESS OF MAKING SAME.

1,354,105. Specification of Letters Patent. Patented Sept. 28, 1920.

No Drawing. Application filed April 29, 1920. Serial No. 377,712.

*To all whom it may concern:*

Be it known that I, MAX HARTMANN, a citizen of the Swiss Republic, and resident of Basel, Switzerland, have invented new and useful Mercury Compounds of Glucosids and Process of Making Same, of which the following is a full, clear, and exact specification.

I have found that glucosids, as for instance amygdalin, salicin, arbutin, etc., can be converted easily into mercury compounds wherein the mercury is combined organically. It is true that it is well known that the greater part of the aromatic compounds can be combined with mercury. However such mercury compounds show often the disadvantage that they are only slightly soluble in water or only in concentrated lyes, as it is for instance in the case of mercury salicylate. On the contrary, most of the new compounds are very easily soluble in water, showing a neutral or acid reaction. They have the advantage over other mercury compounds that they are applicable for injections, show a relatively feeble toxicity and do not produce cutaneous necroses.

It could not be foreseen that by mercurizing glucosids the structure of these compounds would be preserved, the glucosids being easily decomposable. It is further surprising that the mercurization of the glucosids occurs readily in aqueous solutions and very quickly. Usually after a heating to about 60° C. for half an hour, the mercury can no further be detected by soda lye. The invention provides a means of combining two substances which are both therapeutically valuable, as for instance arbutin and mercury.

The new mercury compounds of glucosids constitute white powders soluble in water and difficulty soluble in organic solvents.

The invention will be illustrated by the following examples.

*Example 1.*

3 gr. of amygdalin and 3 gr. of mercuric acetate are heated in 100 gr. of water for 1 to 2 hours on a water bath to about 70° C. As soon as tests with soda lye do not further precipitate yellow mercuric oxid, the solution is evaporated in vacuum to dryness and the remaining blistery residue is pulverized with small quantities of alcohol and of ether mixed together, whereby it is transformed into a fine crystalline powder. This latter is separated by filtration and suction, washed with ether and dried in an exsiccator. There is thus obtained a white powder very easily soluble in water with neutral reaction. By adding soda lye to the aqueous solution, there is not produced a precipitate of mercuric oxid. Hydrogen sulfid or ammonium sulfid produces in the said aqueous solution a precipitate of mercuric sulfid.

*Example 2.*

2.9 parts of salicin are heated on a water bath with 3 parts of mercuric acetate in 100 parts of water until a sample of the mass gives no longer with soda lye a precipitate of mercuric oxid, that is to say for about one hour. The mass is evaporated in a vacuum to dryness and pulverized with a small quantity of ether, whereby a white crystalline powder is obtained, which is dried in an exsiccator. The product is easily soluble in water and difficultly soluble in absolute alcohol, ether and chloroform. From the new compound the mercury can be split off by hydrogen sulfid or by strong acids, but not by alkalis.

*Example 3.*

27 parts of arbutin and 30 parts of mercuric acetate are heated in 200 parts of alcohol of 50 per cent., for 1 to 2 hours, on a water bath, at 70 to 80° C. As soon as an addition of soda lye to a sample of the mass gives no further precipitate of mercuric oxid, the mass is evaporated in a vacuum to dryness and the amorphous residue thus obtained pulverized with dry ether, whereby it becomes crystalline. The product is separated by filtration and suction and dried. It is a white powder, easly soluble in water. An addition of soda lye to the aqueous solution precipitates at first a white basic compound dissolving in an excess of soda lye to a clear solution. Hydrochloric acid added to the aqueous solution precipitates mercuric chlorid and hydrogen sulfid added to the same aqueous solution separates mercuric sulfid.

What I claim is:

1. As new products the herein described mercury compounds of glucosids constituting white powders soluble in water, but very difficultly soluble in organic solvents.

2. As a new product, the herein described mercury compound of arbutin, which constitutes a white powder easily soluble in water and an excess of soda lye and difficultly soluble in alcohol, ether and chloroform.

In witness whereof I have hereunto signed my name this 12th day of April, 1920, in the presence of two subscribing witnesses.

MAX HARTMANN.

Witnesses:
 JOSEPH SUTTERLI,
 AMAND RITTER.